(12) United States Patent
Horski

(10) Patent No.: US 6,554,230 B1
(45) Date of Patent: Apr. 29, 2003

(54) ENGINE COOLING SHROUD HAVING LEAD TROUGH AND MOTOR LEAD WIRE LOCATOR ASSOCIATED WITH LEAD TROUGH

(75) Inventor: Marek Horski, Ontario (CA)

(73) Assignee: Siemens VDO Automotive Inc., Mississauga (CA)

( * ) Notice: Subject to any disclaimer, the term of this patent is extended or adjusted under 35 U.S.C. 154(b) by 0 days.

(21) Appl. No.: 10/100,594

(22) Filed: Mar. 18, 2002

(51) Int. Cl.[7] .................................................. F16L 3/00
(52) U.S. Cl. .......................................... 248/49; 310/71
(58) Field of Search ......................... 248/49, 74.1, 74.2, 248/65, 56; 310/71, 270, 91; 174/48, 156

(56) References Cited

U.S. PATENT DOCUMENTS

| | | | |
|---|---|---|---|
| 3,659,319 A | * | 5/1972 | Erickson ...................... 24/304 |
| 4,636,669 A | | 1/1987 | Plunkett et al. |
| 4,649,304 A | | 3/1987 | Antherton et al. |
| 5,002,019 A | | 3/1991 | Klaucke et al. |
| 5,131,352 A | | 7/1992 | Hoshino et al. |
| 5,180,279 A | | 1/1993 | McLane-Goetz et al. |
| 5,182,848 A | | 2/1993 | Wheeler |
| 5,763,969 A | | 6/1998 | Metheny et al. |
| 5,813,489 A | | 9/1998 | Potier et al. |
| 5,868,197 A | | 2/1999 | Potier |
| 5,889,343 A | | 3/1999 | Bryant et al. |
| 5,896,720 A | * | 4/1999 | Bond ........................... 52/698 |
| 5,949,167 A | | 9/1999 | Blalock et al. |
| 6,106,228 A | | 8/2000 | Bartlett |
| 6,157,110 A | | 12/2000 | Strobl |
| 6,182,930 B1 | * | 2/2001 | Lindborg ...................... 248/49 |
| 6,209,627 B1 | | 4/2001 | Hasumi |
| 6,283,706 B1 | | 9/2001 | Cochran et al. |
| 6,315,034 B1 | | 11/2001 | Mahe et al. |
| 6,342,741 B1 | | 1/2002 | Fukui et al. |
| 6,382,569 B1 | * | 5/2002 | Schattner et al. .......... 248/74.1 |
| 6,429,557 B2 | * | 8/2002 | Sheeran et al. ................ 310/71 |

FOREIGN PATENT DOCUMENTS

EP 0186581 A1 2/1986

OTHER PUBLICATIONS

U.S. patent application Publication 2001/0006312 to Sheeran et al. Pub date Sep. 2001.*

* cited by examiner

Primary Examiner—Ramon O. Ramirez

(57) ABSTRACT

A shroud 100 is provided for carrying an electric motor 118 of an engine cooling assembly. The motor 118 has a lead wire assembly 128 to control the operation of the motor. The shroud includes a frame 112 defining an opening 114 there through. A motor mount structure 116 is provided in the opening. A plurality of struts 124 extends in the opening from the frame to the motor mount structure thereby coupling the motor mount structure to the frame. At least one of the struts 124' defines a lead trough 127 constructed and arranged to receive the lead wire assembly of the motor. A resilient locator 130 is associated with the lead trough and is constructed and arranged to guide the lead wire assembly into the lead trough and to maintain the lead wire assembly within the lead trough without applying constant pressure on the lead wire assembly.

14 Claims, 5 Drawing Sheets

ENGINE COOLING SHROUD HAVING LEAD TROUGH AND MOTOR LEAD WIRE LOCATOR ASSOCIATED WITH LEAD TROUGH

FIELD OF THE INVENTION

The invention relates to vehicle engine cooling modules and, more particularly, to a shroud having a lead trough and locator for receiving and retaining a lead wire assembly of an electric motor.

BACKGROUND OF THE INVENTION

A conventional shroud 10 for carrying an electric motor 12 has a lead trough 14 as shown in FIG. 1. With this arrangement, the motor lead wire assembly 16 is passed under retaining tabs 18 with the retaining tabs 18 providing constant pressure on the lead wires assembly 16. The process of manually guiding the lead wire assembly 16 under the retaining tabs 18 is time consuming. In addition, the constant contact of the retaining tabs 18 with the lead wire assembly 16 may result in damage to the lead wire assembly.

Accordingly, there is a need to improve the process of placing and retaining a motor lead wire assembly in a trough of a shroud.

SUMMARY OF THE INVENTION

An object of the invention is to fulfill the need referred to above. In accordance with the principles of the present invention, this objective is achieved by providing a shroud for carrying an electric motor of an engine cooling assembly. The motor has a lead wire assembly to control the operation of the motor. The shroud includes a frame defining an opening there through; a motor mount structure in the opening; and struts in the opening extending from the frame to the motor mount structure thereby coupling the motor mount structure to the frame. At least one of the struts defines a lead trough constructed and arranged to receive the lead wire assembly of the motor. The shroud also includes a resilient locator associated with the lead trough constructed and arranged to guide the lead wire assembly into the lead trough and to maintain the lead wire assembly within the lead trough without applying constant pressure on the lead wire assembly.

In accordance with another aspect of the invention a method of coupling a lead wire assembly of an electric motor to a shroud carrying the motor is provided. The lead wire assembly includes at least a pair of lead wires. The shroud includes a lead trough for receiving the lead wire assembly and a pair of resilient tabs associated with the lead trough. The pair of tabs is in spaced relation to define a tab opening communicating with an opening of the lead trough. The method positions the pair of lead wires such that one lead wire is above the other lead wire defining a generally vertical arrangement of the lead wire assembly. The lead wire assembly is inserted into the tab opening while in the vertical arrangement so as to be disposed in the lead trough. The lead wire assembly is then rotated generally 90 degrees defining a generally horizontal arrangement of the lead wire assembly in the lead trough. A width of the lead wire assembly in the horizontal arrangement is greater than a width of the lead wire assembly in the vertical arrangement. The width of the lead wire assembly in the horizontal arrangement is greater than the size of the tab opening so that the tabs maintain the lead wire assembly in the lead trough without applying constant pressure on the lead wire assembly.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
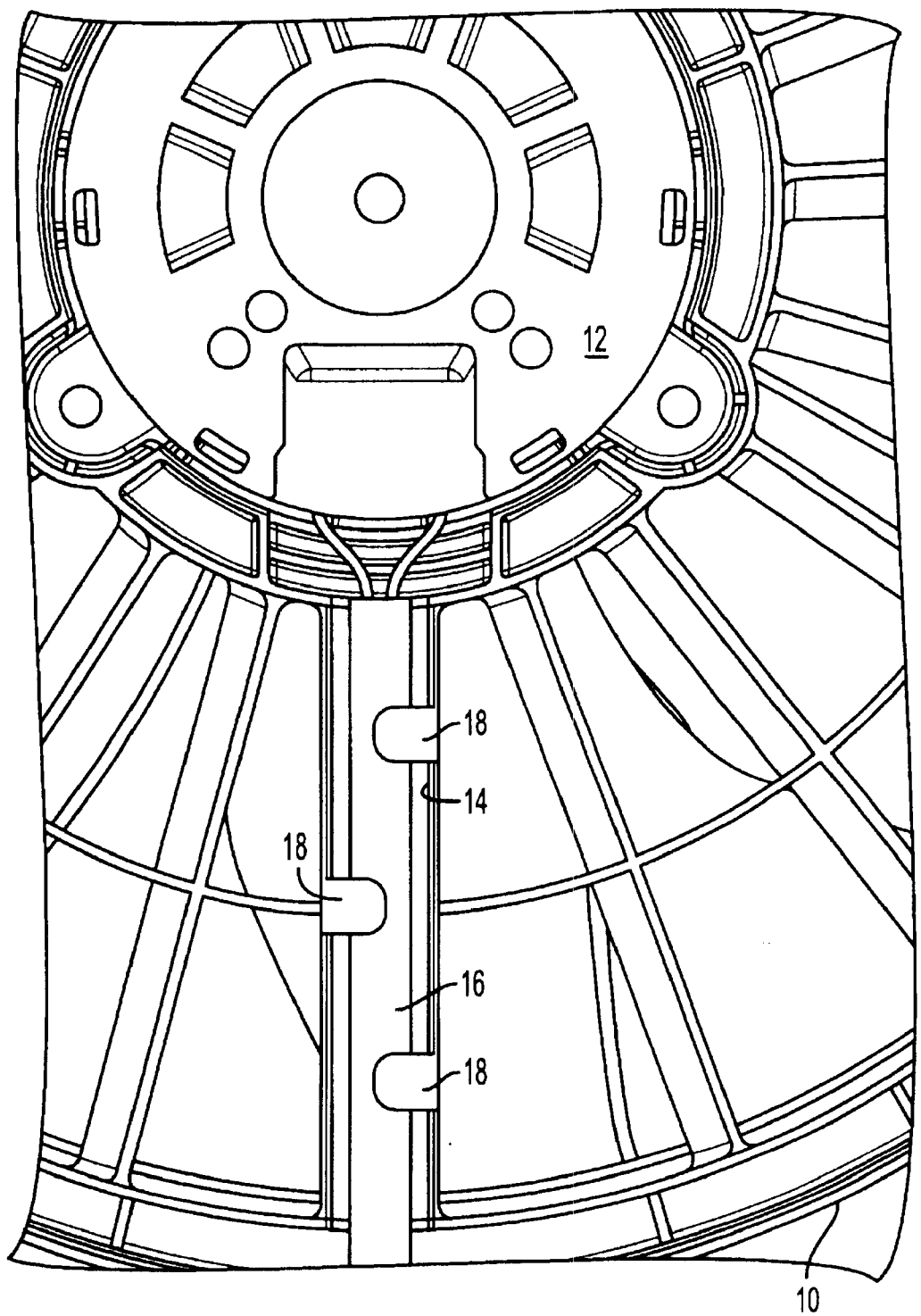
FIG. 1 is an enlarged plan view of a shroud having a conventional lead trough with retaining tabs for receiving and retaining motor lead wire assembly.
Figure 2:
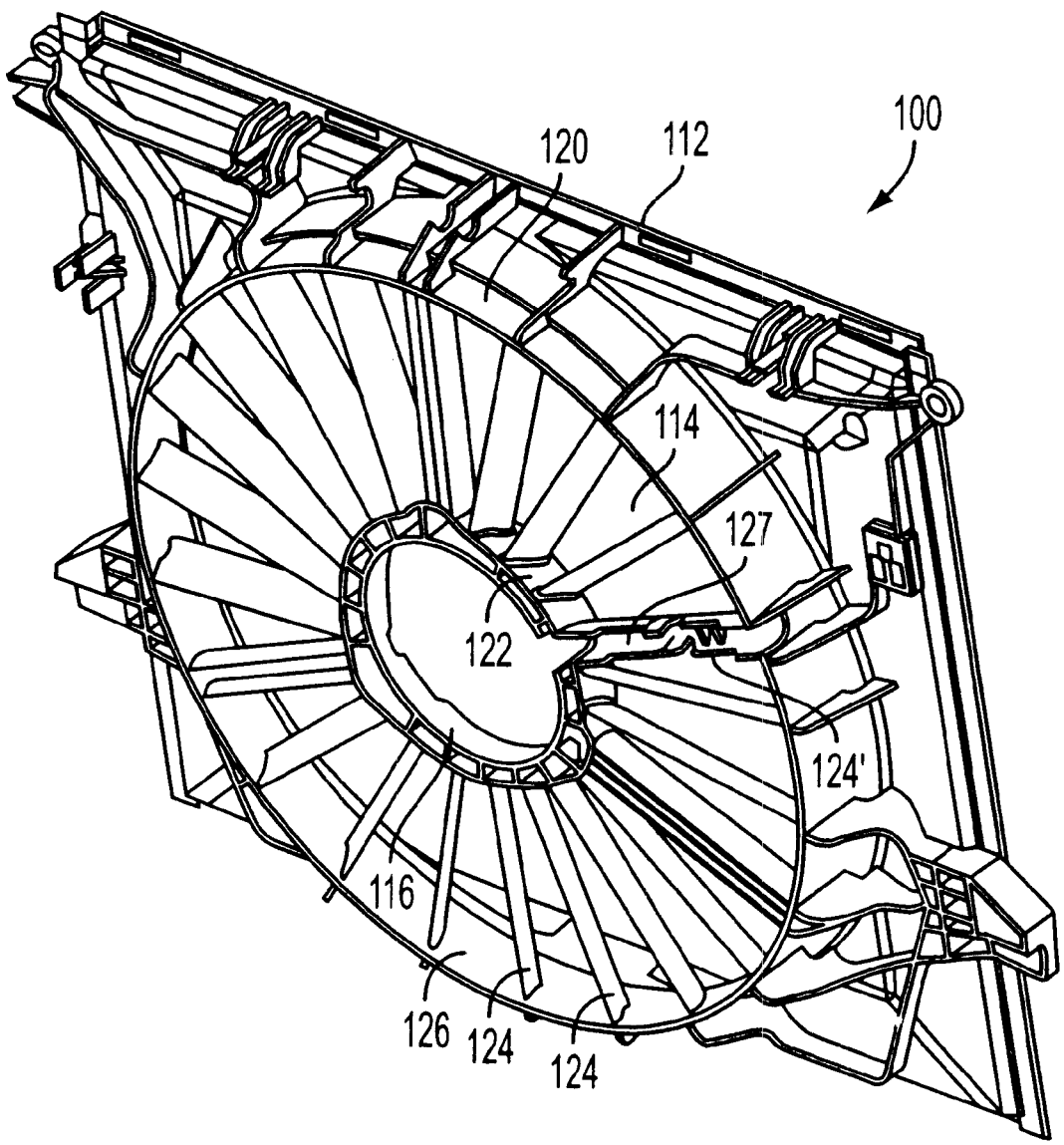
FIG. 2 is a perspective view of a shroud having a trough and locator provided in accordance with the principles of the present invention.
Figure 3:
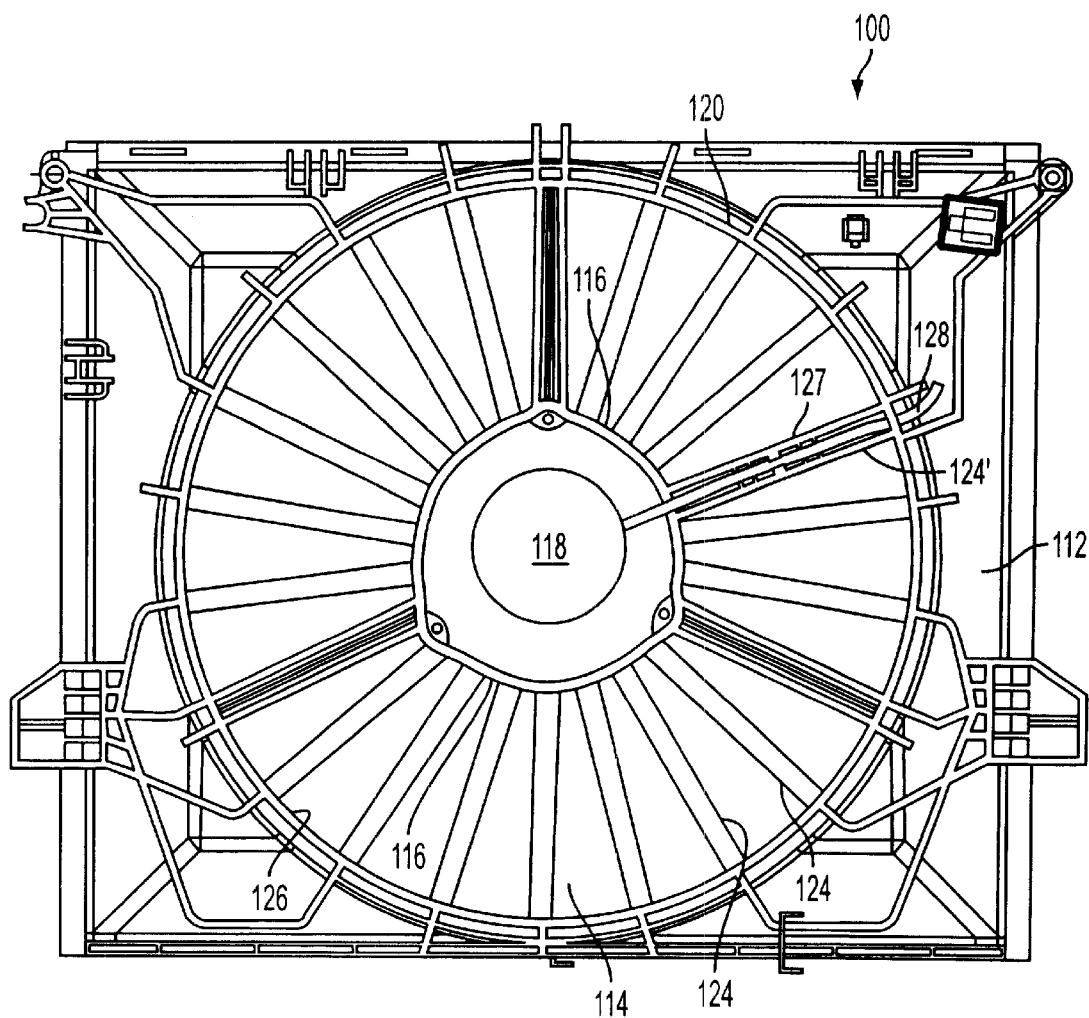
FIG. 3 is a front view of the shroud of FIG. 2, shown carrying an electric motor.

With reference to FIG. 2, an exemplary embodiment of a shroud 100 for an engine-cooling module is shown accordance with the principles of the present invention. The shroud 100 includes a frame 112 defining an opening 114 there through. A motor mount structure 116 is provided in the opening 114. As shown in FIG. 3, an electric motor 118 is mounted to the motor mount structure 116. The frame 112 includes a ring member 120 constructed and arranged to define the annular opening 114. The motor mount structure 116 has a generally annular periphery 122.

Figure 4:
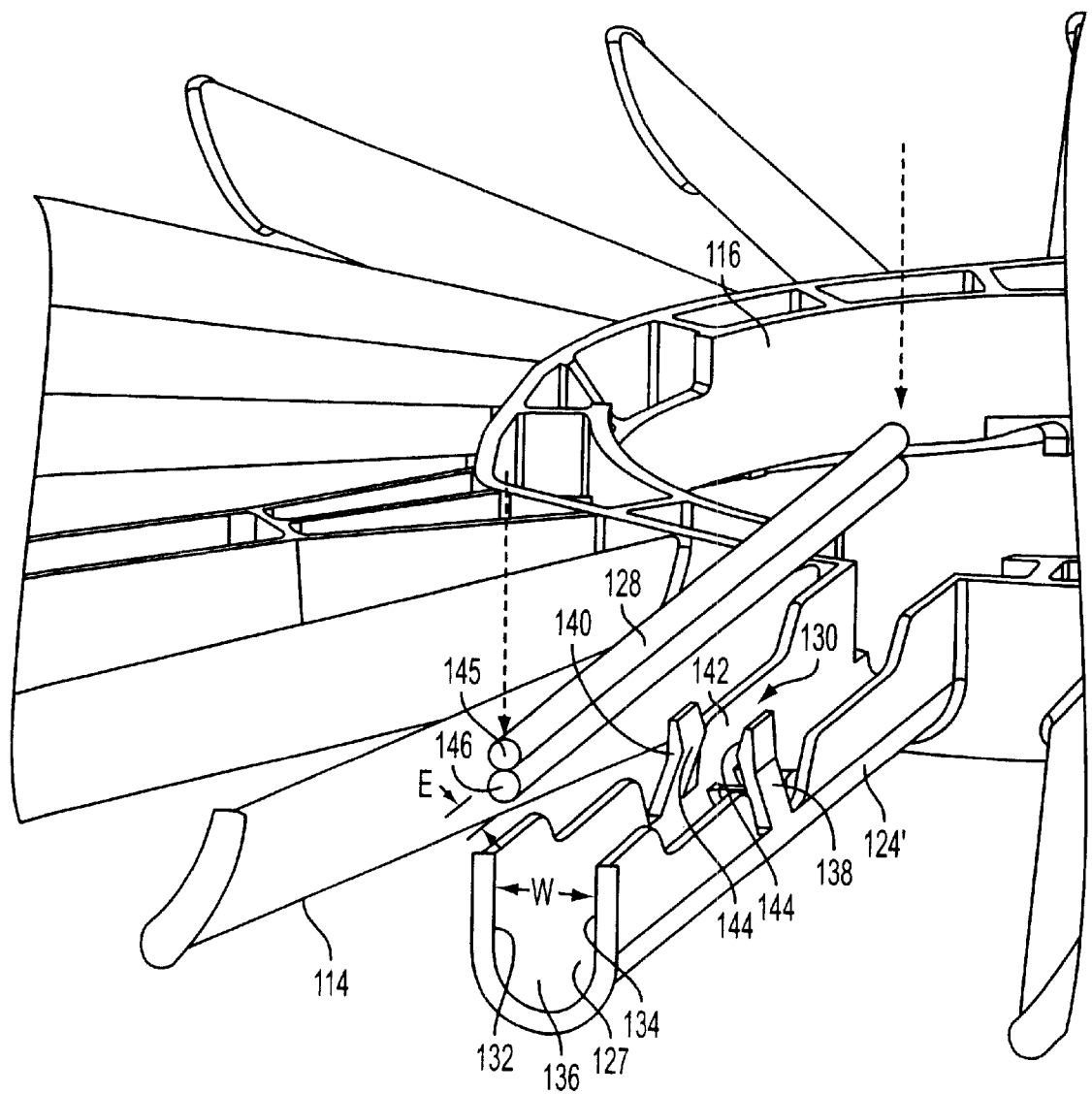
FIG. 4 is a view of the lead wire assembly in a vertical arrangement while being inserted into the locater and trough of the invention.

Struts 124 are provided in the opening 114 extending generally radially from an inner surface 126 of the ring member 120 to the periphery 122 of the motor mount structure 116. The struts 124 couple the motor mount structure 116 to the frame 112. At least one of the struts 124' defines a lead trough 127 constructed and arranged to receive the lead wire assembly 128 of the motor 118 (FIG. 3). A resilient locator, generally indicated at 130 in FIG. 4, is associated with the lead trough 127 and is constructed and arranged to guide the lead wire assembly 128 into the lead trough 127 and to maintain the lead wire assembly 128 within the lead trough 127 without applying constant pressure on the lead wire assembly.

The trough 127 includes a pair of sidewalls 132 and 134 in spaced relation defining a width W of an opening 136 of the trough 127. In the illustrated embodiment, the resilient locator 130 includes a pair of tabs 138 and 140 disposed in opposing relation with each tab being coupled to an associated sidewall of the trough 127. The tabs 138 and 140 define an opening 142 there-between that communicates with the opening 136 of the trough 127. The size of the opening 142 of the tabs is less than that of the opening 136 of the trough 127. Each of the tabs 138 and 140 has a camming surface 144 constructed and arranged to be engaged by the lead wire assembly 128 to spread the tabs apart and to guide the lead wire assembly into the trough 127.

The trough 127, resilient locator 130, and the shroud 100 are preferably molded integrally from plastic.

Figure 5:
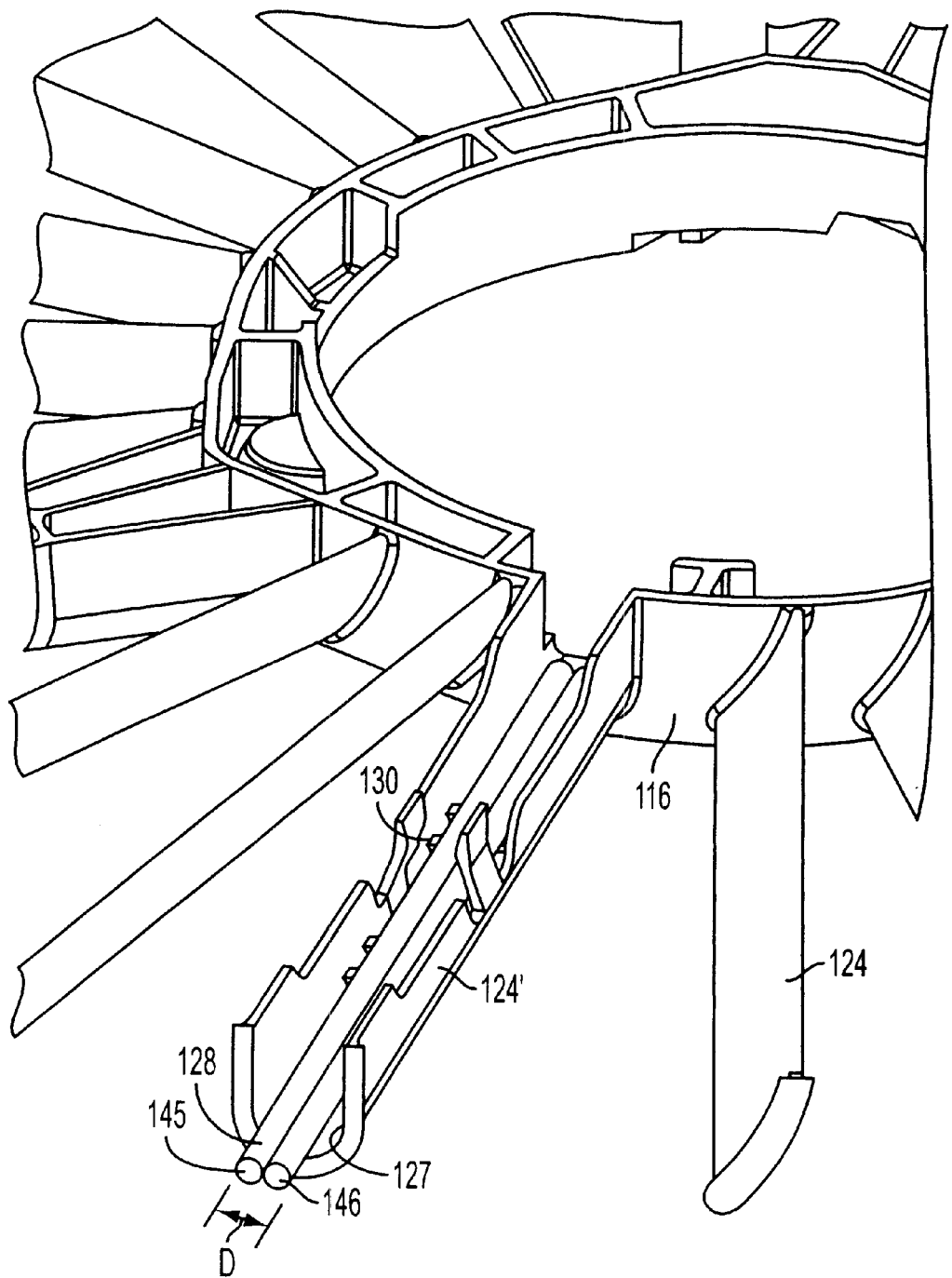
FIG. 5 is a view of the lead wire assembly in a horizontal arrangement within the trough and being retained by the locator of the invention.

Typically, the lead wire assembly 128 includes a pair of lead wires 145 and 146 that are provided as a single assembly. With reference to FIG. 4, a method of coupling a lead wire assembly 128 of the electric motor 118 to the shroud 100 includes positioning the pair of lead wires 145 and 146 such that one lead wire 145 is above the other lead wire 146 defining a generally vertical arrangement of the lead wire assembly 128. The lead wire assembly 128 is then inserted into the tab opening 142 when in the vertical arrangement so as to be disposed in the lead trough 127. Thereafter, as shown in FIG. 5, the lead wire assembly 128 is rotated generally 90 degrees defining a generally horizontal arrangement of the lead wire assembly 128 in the lead trough 127. A width D of the lead wire assembly 128 in the horizontal arrangement is greater than a width E of the lead wire assembly 128 in the vertical arrangement thereof. The width D of the lead wire assembly 128 in the horizontal arrangement is greater than the size of the tab opening 142 in a non-stressed condition so that the tabs 138 and 140 maintain the lead wire assembly 128 in the lead trough 127 without applying constant pressure on the lead wire assembly.

It can be appreciated that the tabs 138 and 140 can be made flexible enough such that the lead wire assembly 128 can be pushed through the tab opening 142 in the horizontal arrangement, but it is preferred to move the lead wire assembly 128 past the tabs in the vertical arrangement as described above, to reduce the stress on the tabs.

Since the locator 130 does not provide constant pressure on the lead wire assembly 128 while in the trough 127, there is less likelihood that the lead wire assembly will be damaged over time.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A shroud for carrying an electric motor of an engine cooling assembly, the motor having a lead wire assembly to control the operation of the motor, the shroud comprising:
    a frame defining an opening there through,
    a motor mount structure in the opening,
    struts in the opening extending from the frame to the motor mount structure thereby coupling the motor mount structure to the frame, at least one of the struts defining a lead trough constructed and arranged to receive the lead wire assembly of the motor, and
    a resilient locator formed integrally with the lead trough and constructed and arranged to guide the lead wire assembly into the lead trough and to maintain the lead wire assembly within the lead trough without applying constant pressure on the lead wire assembly,
    wherein the lead trough includes a pair of sidewalls in spaced relation defining a width of an opening of the trough, and the resilient locator includes a pair of tabs in opposing relation with each tab being coupled to an associated sidewall of the trough, and
    wherein each of the tabs has a camming surface constructed and arranged to be engaged by the lead wire assembly to spread the tabs apart and to guide the lead wire assembly into the trough.

2. The shroud of claim 1, in combination with the electric motor, the electric motor being mounted to the motor mount structure with the lead wire assembly of the motor being maintained within the lead trough by the resilient locator.

3. The shroud of claim 1, wherein the frame includes a ring member constructed and arranged to define an annular said opening, and the motor mount structure has a generally annular periphery, the struts extending generally radially from an inner surface of the ring member to the periphery of the motor mount structure.

4. The shroud of claim 1, wherein the resilient locator is formed integrally with the lead trough from plastic.

5. The shroud of claim 4, wherein the lead trough is formed integrally with a strut from plastic.

6. The shroud of claim 1, wherein the tabs define an opening there-between, the opening of the tabs being in communication with the opening of the trough, and the size of the opening of the tabs being less than that of the opening of the trough.

7. A shroud for carrying an electric motor of an engine cooling assembly, the motor having a lead wire assembly to control the operation of the motor, the shroud comprising:
    a frame defining an opening there through,
    means for mounting the motor in the opening,
    struts, in the opening extending from the frame to the motor mount structure, for coupling the means for mounting to the frame, at least one of the struts including a lead trough constructed and arranged to receive the lead wire assembly of the motor, and
    means, associated with the lead trough, for guiding the lead wire assembly into the lead trough and for maintaining the lead wire assembly within the lead trough without applying constant pressure on the lead wire assembly,
    wherein the lead trough includes a pair of sidewalls in spaced relation defining a width of an opening of the trough, and
    wherein the means for guiding and maintaining the lead wires assembly is a resilient locator formed integrally with the lead trough, the resilient locator including a pair of tabs in opposing relation with each tab being coupled to an associated sidewall of the trough.

8. The shroud of claim 7, wherein the tabs define an opening there-between, the opening of the tabs being in communication with the opening of the trough, and the size of the opening of the tabs being less than that of the opening of the trough.

9. The shroud of claim 8, wherein each of the tabs has a camming surface constructed and arranged to be engaged by the lead wire assembly to spread the tabs apart and to guide the lead wire assembly into the trough.

10. The shroud of claim 7, in combination with the electric motor, the electric motor being mounted to the means for mounting with the lead wire assembly of the motor being maintained within the lead trough by the means for guiding and maintaining the lead wire assembly.

11. The shroud of claim 7, wherein the frame includes a ring member constructed and arranged to define an annular said opening, and the means for mounting has a generally annular periphery, the struts extending generally radially from an inner surface of the ring member to the periphery of the motor mount structure.

12. The shroud of claim 11, wherein the lead trough is formed integrally with a strut from plastic.

13. The shroud of claim 7, wherein the resilient locator is formed integrally with the lead trough from plastic.

14. A method of coupling a lead wire assembly of an electric motor to a shroud carrying the motor, the lead wire assembly including at least a pair of lead wires, the shroud including a lead trough for receiving the lead wire assembly and a pair of resilient tabs associated with the lead trough, the pair of tabs being in spaced relation to define a tab opening communicating with an opening of the lead trough, the method including:

positioning the pair of lead wires such that one lead wire is above the other lead wire defining a generally vertical arrangement of the lead wire assembly and inserting the lead wire assembly into the tab opening while in the vertical arrangement so as to be disposed in the lead trough, rotating the lead wire assembly generally 90 degrees defining a generally horizontal arrangement of the lead wire assembly in the lead trough, a width of the lead wire assembly in the horizontal arrangement being greater than a width of the lead wire assembly in the vertical arrangement, the width of the lead wire assembly in the horizontal arrangement being greater than the size of the tab opening so that the tabs maintain the lead wire assembly in the lead trough without applying constant pressure on the lead wire assembly.

* * * * *